Dec. 30, 1941.  W. M. KERMODE ET AL  2,268,287
PACKING DEVICE FOR SHAFTS
Filed July 24, 1940
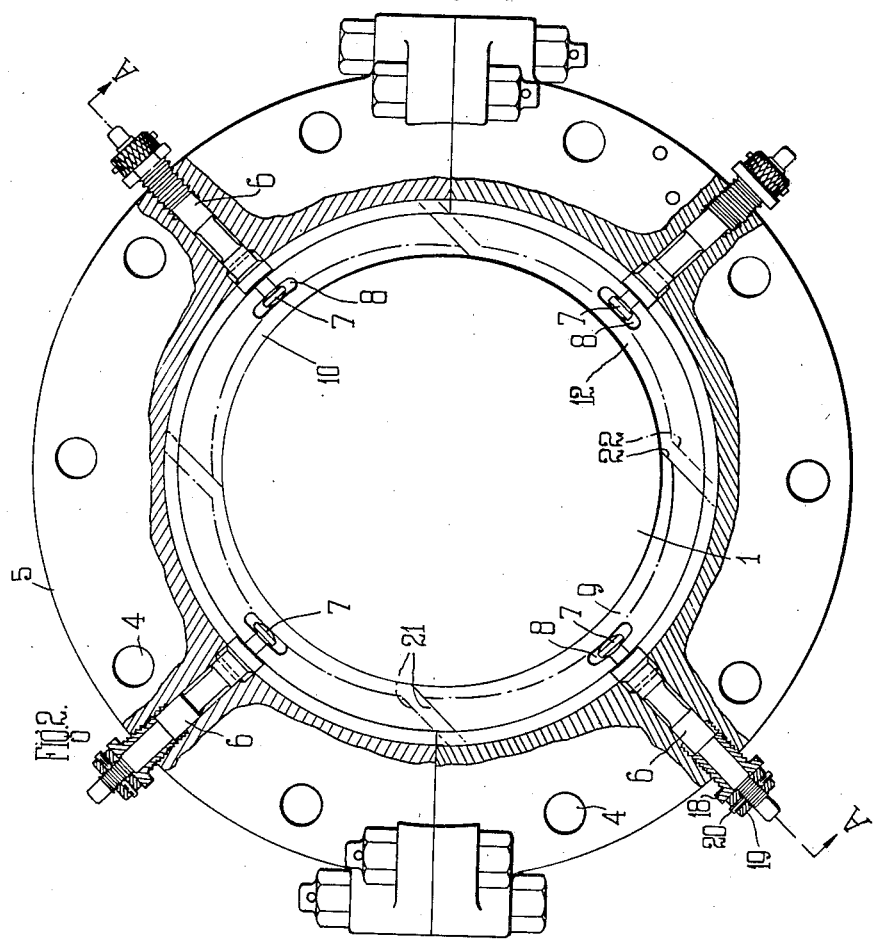
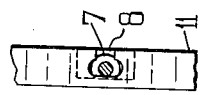
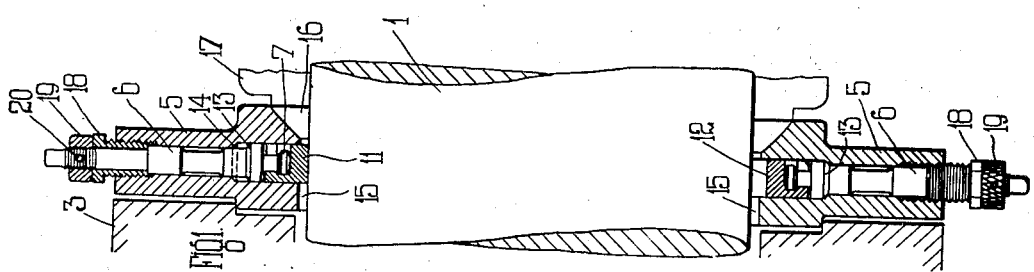
INVENTORS
W. M. KERMODE and
JOHN HOWARD, DECEASED
BY EDITH L. HOWARD EXECUTRIX
By Mason & Porter ATTORNEYS

UNITED STATES PATENT OFFICE 2,268,287

PACKING DEVICE FOR SHAFTS

William Marsden Kermode, Bradford, England, and John Howard, deceased, late of Crosby, England, by Edith Isobel Howard, executrix, Bangor, Northern Ireland, assignors to United States Metallic Packing Company Limited, Bradford, England, a British company Application July 24, 1940, Serial No. 347,322
In Great Britain May 23, 1939

4 Claims. (Cl. 286—20)

The present invention relates to improved packing devices for shafts. An object of the present invention is to provide a packing which will temporarily form a seal for a rotating or oscillating shaft during such time as the permanent packing may be removed or wholly or partly dismantled for the purpose of renewal or adjusting.

According to the present invention a housing encircling the shaft is provided with a radial recess to accommodate a plurality of annular segments, the internal diameter of which is equal to the external diameter of the shaft, means being provided to retract said segments into the said recesses or to displace them therein into contact with the shaft.

The invention is more particularly described with reference to the accompanying drawing, in which:

Fig. 1 is a sectional elevation of one form of construction on the line A—A of Fig. 2.

Fig. 2 is an end view partly in section,

Fig. 3 is a detail.

A rotary shaft 1 is supported in any form of bearing carried by a housing 3. On this housing, by means of bolts passing through bolt holes 4, a casing 5 is mounted which has a number of radial sockets or perforations, in each of which is mounted a displaceable spindle 6 provided with a mushroom-headed end 7 engaging within an open socket 8 in part annular segments 9, 10, 11, 12, respectively. One side of the mushroom head 7 has a flattened portion engaging a segment to prevent the rotation of the spindle 6 relatively to the segments.

Normally the segments will be drawn back out of contact with the shaft into the position shown in chain dotted lines in Fig. 2 of the drawing, when a valve seating 13 on the spindle 6 comes against the seating 14 in the casing 5, and this prevents leakage of fluid from the space 15 surrounding the shaft by the sockets or perforations in the casing 5.

When, however, it is desired to effect a temporary seal on the shaft 1, for instance when it is desired to dismantle for replacement or inspection the main bearing element including such parts as 16, 17, the spindles 6 are thrust radially inwardly by screwing down a threaded sleeve 18 until each segment 9, 10, 11, 12, contacts with the shaft 1. When the segments are being retracted the sleeves 18 abut against a nut 19 locked by a pin 20.

In bringing the device into operation, to seal the shaft, it will be desirable to cause the segments 9, 10, first to engage with the shaft and then subsequently the segments 11, 12.

As shown in Fig. 2 of the drawing, it will be preferred that two of the segments such as 9, 10, have their ends parallel to the axis of displacement of the spindles 6, whilst the other two segments 11, 12, have their ends 21, 22, respectively, at right angles to the axis of their spindles 6. By this means the tight packing of the segments on the shaft 1 is possible.

When all the segments are in position it is obvious that no fluid in the space 15 can escape, and thus the main packing can be dismantled and replaced, either with the shaft stationary or with this running, although it will be desirable to reduce the time of running of the shaft 1 with the segments in position as much as possible.

In an alternative arrangement the segments may be provided with a dovetail or T-shaped groove into which the mushroom headed spindle head with its flattened sides can be slid from one end; the segment is thereby firmly attached to the pin, but is capable of rocking slightly relatively to it.

Instead of having one group of segments as shown in Fig. 1, two groups of segments may be provided in parallel planes.

The normal bearing or packing gland may be of any desired type, that is to say it may either consist of a soft packing or a spherical packing, in which case the element 16 of the spherical packing, as illustrated in Fig. 1 by way of example, may co-operate with a spherical surface on the casing 5 of the device.

As the segments are only temporarily in contact with the shaft a perfect packing can always be temporarily maintained between segments and the shaft.

If desired powerful springs may be interposed between the segments and the spindles to hold the segments elastically in contact with the shaft.

It will be appreciated that three or any higher number of segments may be utilised without departing from the scope of the invention and that the inner bearing surfaces of the segments, where these cooperate with the shaft for preventing leakage along the latter, are of rigid material.

We declare that what we claim is:

1. A packing device for shafts comprising a power shaft, a fixed casing encircling the shaft and having at least three radial recesses therein, a corresponding number of arcuate segments each subtending an arc of not more than 120° and providing an internal rigid bearing surface of a diameter equal to the external diameter of the shaft, a corresponding number of spindles one disposed in each of the said recesses, each of said spindles having a mushroom head engaging a corresponding segment and each mushroom head having a flattened surface engaging the corresponding segment whereby to prevent rotation of the spindle relative to the segment, and means for displacing said spindles radially of the shaft whereby to shift the segments into and out of engagement with the shaft.

2. A packing device for shafts comprising a power shaft, a fixed casing encircling the shaft and having at least three radial recesses therein, a corresponding number of annular segments each subtending an arc of not more than 120° with a rigid bearing surface of arcuate form complementary to the external periphery of the shaft and terminating at its ends in flat bearing surfaces for surface engagement with the flat surfaces of adjacent segments, a corresponding number of spindles one in each recess and adapted to seal the recesses against outward flow of liquid, mushroom heads on said spindles engaging loosely with said segments to permit lateral adjustment of each segment relatively to its spindle, and means for displacing each spindle and its segment as a unit radially of said casing.

3. A packing device for shafts comprising a power shaft, a fixed casing encircling said shaft, four spindles guided radially in said casing, four annular segments each connected to a corresponding spindle for displacement therewith radially of the casing but with limited lateral play, two opposed segments having their end surfaces parallel to the axes of their respective spindles and the other two opposed segments having their end surfaces at right angles to their respective spindles and each of said segments having an internal curvature complemental to the external contour of the shaft, and means for displacing the spindles with the segments radially of the casing.

4. A packing device for shafts, as claimed in claim 3, and wherein each spindle is non-rotatably guided in a radial recess in the fixed casing and has means for sealing said recess against outward flow of liquid from the shaft periphery.

WILLIAM MARSDEN KERMODE.
EDITH ISOBEL HOWARD,
*Executrix of the Estate of John Howard, Deceased.*